United States Patent Office 2,861,108
Patented Nov. 18, 1958

2,861,108

PRODUCTION OF POLYETHENOXY ALKYL PHENATE ETHERS

Joseph V. Karabinos and Aloysius T. Ballun, Joliet, Ill., assignors, by mesne assignments, to Olin Mathieson Chemical Corporation, New York, N. Y., a corporation of Virginia No Drawing. Application June 30, 1953
Serial No. 365,250

8 Claims. (Cl. 260—613)

The present invention relates generally to non-ionic compounds and mixtures of a kind made by condensing alkyl phenol with ethylene oxide, and more particularly to a chemical treatment of the reaction mass to improve the color and general utility thereof, including a lightening of its color and a modification of some physical qualities.

The class of compounds involved as the raw material for practice of the present invention is technically referred to as polyethenoxy ether of alkyl phenol. The material results from several reactions during the condensation, including ether-forming condensation between the alkyl phenol and ethylene oxide and between the resulting ether-alcohols and ethylene oxide. In consequence, the reaction mass is a complex mixture commonly identified by its average molecular weight and by the average number of ethylene oxide (or ethenoxy) units involved in a formula representing a single compound according to said average molecular weight. Such a general formula is $A—C_6H_4—O—(CH_2—CH_2—O)_nH$ wherein $A$ represents an alkyl radical and $n$ represents a numerical value not necessarily a whole number.

Compounds in which radical $A$ is mixed octyl- or nonyl-isomers and in which $n$ varies from 2 to 15, are well known commercially as dispersants and detergents in an aqueous medium, the water-solubility increasing with values of $n$, and in general beginning where $n$ equals 7. This last value is not precise because at a borderline region part of the mixture may be readily soluble in water while the remainder is merely water-dispersible.

The above-described materials are normally liquid at room temperature or are solids melting below 60° C. The condensation reaction mass is dark colored. The dark coloration is a deterrent to saleability of the liquid detergent materials and to their general utility. The liquid detergent materials are commonly used as an ingredient in solid comminuted detergent compounds, being present with solid detergent inorganic salts which are white in color when used as clean crystals. Where the colored subject ether mass is an ingredient with such white salts, its dark color renders the resulting solid compound dirty in appearance which is objectionable.

The present invention aims to improve the utility of such dark-colored ether masses resulting from such condensation.

It is a general object of the invention to lighten the color thereof by chemical reaction which attacks the colored impurities, forming new lighter colored ingredients therefrom.

It is a particular object of the invention to subject a colored reaction mass of the subject ethers to the action of ozone alone, or of hydrogen peroxide first and then ozone.

Various other and ancillary objects and advantages of the present invention will appear from the following description and explanation of the invention in connection with its preferred use to form lighter colored detergents from original condensation reaction masses. From the following illustrative examples and explanation, it will be appreciated that the present invention in its broadest aspect is not limited to and by the illustrative examples.

The condensation of alkyl phenol and ethylene oxide to form the subject ether complex is no part of the present invention, it being well-known. The basic reaction is described in U. S. No. 1,970,578, issued to Schoeller and Wittwer, wherein an organic compound having an active hydrogen atom condenses with ethylene oxide in a chain reaction. Others have specifically described the organic compound as an alkyl phenol or mixture thereof, for example, Black in U. S. No. 2,555,285 and British No. 470,181, for producing non-ionic detergents.

The present invention is based in part upon the discovery that in the condensations involving ethylene oxide there is a side reaction which is disadvantageous. Ethylene oxide reverts to ethylene and oxygen as follows:

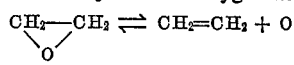

The above reaction is a well-known equilibrium reaction by which ethylene oxide is commercially produced when it runs to the left. At the elevated temperatures of 150° to 210° C. at which such condensations are carried out, with an alkaline catalyst, there is opportunity for this reversion to occur. The released oxygen is active to effect an oxidation. In the condensation reaction with alkyl phenol, formation of a quinoid structure is evident by the newly-created fluorescence of the reaction mass. The fluorescence and the darkening increase and decrease together, and by the corrective reaction of the present invention both may be destroyed.

The present invention is based on the discovery that when the fluorescent dark-colored subject ether masses are treated with ozone, or first with hydrogen peroxide and then with ozone, the color may be lessened, and the extent of decolorizing may be effected to a greater degree than with hydrogen peroxide alone. Progress of the reaction may be followed by measuring the change in light-transmission of the mass. By subjecting a known amount of the subject ether masses having the dark color to gradual additions of known amounts of hydrogen peroxide and by following the color change, the subject ether masses may be in effect evaluated for the content of colored substances, and the end-point for their removal by hydrogen peroxide may be determined. The darker the original color, the more hydrogen peroxide is needed to remove the color and destroy the attendant fluorescent qualities. Hydrogen peroxide acts only to a certain limit. Ozone alone acts to a higher degree of decolorizing, and ozone following hydrogen peroxide decolorizes to a degree greater than the maximum attainable with hydrogen peroxide alone.

The loss of fluorescence clearly indicates that the quinoid structures have been destroyed. The situation is unusual in that the quinoid structures are seemingly formed by one type of oxidation and are then seemingly destroyed by an oxidizing agent. The observations and results described hereinabove conform to a sequence of well-known types of chemical reactions, which as applied to the present invention appear to be a plausable explanation. The following is believed to explain the reactions, but it is not to be assumed that this is the only explanation, and no intention is herein expressed to be bound by it.

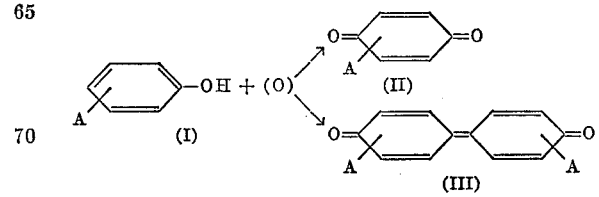

The compound I represents alkyl phenol with its benzene ring. In the presence of oxygen derived from the ethylene oxide it may form one or both of compounds II and III. Compounds II and III having the quinoid structure

explain the fluorescence in the subject ether masses. When hydrogen peroxide or ozone reacts with the subject ether masses containing the colored compounds which fluoresce and which appear to be compounds II and III, new compounds are formed. In the following reaction radical IV represents the substituted quinoid ring of compounds II and III which adds hydrogen peroxide to form the probable radical V, or adds ozone to form radical VI.

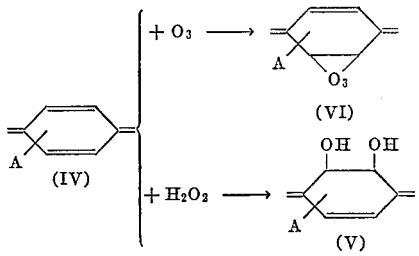

In other words, there is in one case glycol formation breaking at least one double bond in the quinoid ring with the result that the fluorescing quinoid structure disappears and with the result that the new glycol compound is more compatible with water. In the case of ozone there is an ozonide formation likewise breaking a quinoid structure.

Table I shows the change in red light-transmittancy of five ether masses by adding thereto measured quantities of hydrogen peroxide of known strength. This is done by placing 20 grams of a liquid ether mass (melted at 60° C. in the case of ether mass O) in a colorimeter tube of a Coleman instrument, and with a micropipette adding small amounts of aqueous 30% hydrogen peroxide in water solution, and stirring for five minutes before reading the color value. In Table I the tested products are:

I. Ether mass wherein $n=8.5$ and A is mixed nonyl isomers
J. Ether mass wherein $n=11$ and A is mixed nonyl isomers
K. Ether mass wherein $n=11$ and A is mixed octyl isomers
N. Ether mass wherein $n=5$ and A is mixed octyl isomers
O. Ether mass wherein $n=21$ and A is mixed octyl isomers The color value is reported as percent transmission, its absolute value being not critical, but the change being of significance.

TABLE I

*Decolorizing with hydrogen peroxide*

| Aqueous 30% Hydrogen Peroxide, ml. per 20 gm. ether | Percent Color Transmission [1] | | | | |
|---|---|---|---|---|---|
| | I | J | K | N | O |
| .00 | 85.0 | 87.0 | 75.5 | 73.5 | 76.5 |
| .01 | 86.0 | 88.3 | 81.0 | 74.7 | 78.0 |
| .02 | 87.0 | 89.0 | 84.0 | 75.5 | 79.8 |
| .03 | 87.8 | 89.5 | 86.5 | 76.5 | 81.0 |
| .04 | 88.5 | 90.2 | 88.5 | 77.7 | 82.0 |
| .05 | 89.0 | 90.7 | 90.0 | 79.0 | 83.2 |
| .06 | 89.3 | 91.1 | 90.7 | 80.0 | 85.0 |
| .08 | 90.0 | 92.0 | 91.0 | 82.0 | 86.5 |
| .12 | 90.5 | 92.5 | 92.0 | 86.0 | 89.5 |
| .15 | | | | 88.0 | 90.5 |
| .20 | | | | 89.0 | 90.5 |

[1] 100% is the transmission by water.

Table I shows that the action of hydrogen peroxide levels off substantially at a maximum. The present invention is based in part upon the discovery that when ozone is used in place of hydrogen peroxide, there is also a leveling off but at a higher value than with hydrogen peroxide.

Table II shows the change in red light-transmittancy of the same ethers tested as in Table I, but with ozone bubbled through the liquids, using calibrated equipment giving the ml. of ozone stated in Table II.

TABLE II

*Decolorizing with ozone*

| Ml. Ozone Gas per 20 gm. ether | Percent Color Transmission | | | | |
|---|---|---|---|---|---|
| | I | J | K | N | O |
| 0 | 85.0 | 87.0 | 75.5 | 73.5 | 76.5 |
| 10 | 85.6 | 87.2 | 88.8 | 79.0 | 93.0 |
| 20 | 86.8 | 89.0 | 94.0 | 83.5 | 95.0 |
| 30 | 88.8 | 92.8 | 96.7 | 87.0 | |
| 45 | 94.4 | 95.0 | 98.0 | 93.0 | |
| 60 | 96.7 | 96.0 | 99.0 | | |
| 80 | 97.0 | 96.4 | 99.6 | | |

Table II shows a leveling off at higher values than in Table I, and the resulting liquids are less colored.

The present invention is also based on the discovery that those ether masses which are the products of Table I, that is, decolorized to the substantial maximum available with hydrogen peroxide, may be further decolorized with ozone. Table III is similar to Table II, using the decolorized products of Table I.

TABLE III

*Decolorizing with hydrogen peroxide followed by ozone*

| Ml. Ozone Gas per 20 gm. ether | Percent Color Transmission | | | | |
|---|---|---|---|---|---|
| | I | J | K | N | O |
| 0 | 90.5 | 92.5 | 92.0 | 89.0 | 90.5 |
| 10 | 90.5 | 94.0 | 96.5 | 93.0 | 96.0 |
| 20 | 91.0 | 95.0 | 98.2 | 94.5 | 97.0 |
| 30 | 91.5 | 95.2 | 99.0 | 95.5 | 97.0 |
| 40 | 92.0 | 95.5 | 99.4 | 96.0 | 97.0 |
| 50 | 93.0 | 95.8 | 99.7 | 96.5 | 97.0 |
| 60 | 94.0 | 96.0 | 99.7 | 96.5 | 97.0 |
| 80 | 96.0 | 96.2 | | | |

The final values of Tables II and III are nearly the same, indicating generally that ozone does all that hydrogen peroxide does and much more.

The dark-colored fluorescent compounds involved in the present invention result independently of the alkyl radical, and are the result of reaction involving the benzene nucleus and the oxygen from the ethylene oxide. When the corrective agent of the present invention is an aqueous solution of hydrogen peroxide, it must mix with the condensation mass to be effective, and the mass must be water-dispersible. The solubility or dispersibility in water of the condensation reaction mass depends for any particular alkyl phenol upon the number of ethenoxy units in the reaction mass.

The most common and useful ones of the polyethenoxy ethers of alkyl phenol are the non-ionic detergent ones of octyl phenol and of nonyl phenol which are water-soluble. The octyl and nonyl phenols employed are the commercial mixtures. In these there are ortho, meta and para compounds of the various alkyl isomers. Para-compounds predominate, and in the case of octyl phenols the iso-octyl radical predominates.

In preparing ether masses for practice of the present invention the various methods known to the art may be employed. These vary in catalyst, temperature and other factors. The ones identified hereinabove have been prepared by passing ethylene oxide into the alkyl phenol at a temperature in the range from 160° to 200° C. in the presence of an alkaline catalyst. The following examples illustrate the preparation of the five ether masses of Table I.

EXAMPLE 1.—ETHER MASS N

Into a half-liter closed and heated flask containing 100 grams of commercial octyl phenol isomers, 0.5 gram of potassium carbonate, and an inert atmosphere of nitrogen, initially at 150° C. was bubbled ethylene oxide gas, the excess being vented from the flask. The temperature rose rapidly to as high as 190° C. from the heat of reaction. Keeping the temperature in the range from 160° to 190° C. for four hours, 107 grams of ethylene oxide was absorbed in the condensation reaction. The product was brown colored and fluorescent.

EXAMPLE 2.—ETHER MASS K

The conditions of Example 1 were maintained for a longer time until 235 grams of ethylene oxide was absorbed.

EXAMPLE 3.—ETHER MASS O

The conditions of Example 1 were maintained for a longer time until 427 grams of ethylene oxide were absorbed. The resulting ether mass solidified on cooling to room temperature.

EXAMPLE 4.—ETHER MASS I

As in Example 1, 100 grams of commercial nonyl phenol isomers were treated to absorb 170 grams of ethylene oxide.

EXAMPLE 5.—ETHER MASS J

The conditions of Example 1 were maintained except for using 218 grams of ethylene oxide in the condensation. The product was semi-solid at room temperature.

In any of the foregoing examples the catalyst may be changed to sodium acetate, or sodium hydroxide, or potassium hydroxide, or sodium carbonate. The following example illustrates such a change.

EXAMPLE 6

In a four-liter stainless steel autoclave 395 grams of commercial nonyl phenol and 2.2 grams of sodium hydroxide is subjected to condensation at 160° to 190° C. with ethylene oxide until 870 grams of the latter are absorbed. The ether mass has an average of 11 ethenoxy units, is liquid, is colored brown, and is fluorescent. Upon treatment with hydrogen peroxide it is changed to a clear amber color and is non-fluorescent.

EXAMPLE 7

The procedure of Example 1 is carried out, but with a change of the temperature to 210° C. before the ethylene oxide is introduced.

Because ozone is relatively more expensive than hydrogen peroxide, the preferred products of the present invention are those which are compatible with aqueous hydrogen peroxide, and the term "water-dispersible" is used herein to comprehend "water-soluble." Although the preferred compounds are those useful in or as detergents, the utility of the products is not set forth as a limitation of the invention.

In the case of those products which are useful for detergency, it has been observed that the action of ozone in the present invention, alone, or following the action of hydrogen peroxide, produces products of increased detergency. Detergency tests are carried out as described below. A value of 100, assigned to the standard, represents the detergency of an excellent commercial detergent. Consequently even small increases over 100 are significant of considerable improvement.

DETERGENCY TESTS

Evaluating products of the present invention for detergency is carried out in the manner set forth by Vaughn and Suter in J. Am. Oil Chem. Soc. vol 27, pp. 249–257 (1950). In the present instance, a composition is made in parts by weight as follows:

| | |
|---|---|
| Specimen of polyethenoxy alkyl phenate | 20 |
| Tetrasodium pyrophosphate | 20 |
| Sodium tripolyphosphate | 20 |
| Soda ash | 39 |
| Carboxymethyl cellulose | 1 |

A standard is chosen of the following composition:

| | |
|---|---|
| Polyethenoxy tallate (Sterox CD[1]) | 15 |
| Tetrasodium pyrophosphate | 20 |
| Sodium tripolyphosphate | 20 |
| Soda ash | 20 |
| Silicate of soda ($Na_2O \cdot SiO_2$) | 24 |
| Carboxymethyl cellulose | 1 |

[1] Monsanto Chemical Co., St. Louis, Missouri.

The detergencies of the standard composition (taken as 100) and of the test composition are determined by dissolving the composition in the amount of 2.5 grams per liter of water. A standard launderometer is used.

Four values are determined, as follows:

(1) Soil removal in hard water (255 p. p. m.).
(2) Soil removal in soft water.
(3) Whiteness retention in hard water (255 p. p. m.).
(4) Whiteness retention in soft water.

In the case of product J the detergency values are given in the following table:

TABLE IV

*Detergency*

| | Soil Removal | | Whiteness Retention | |
|---|---|---|---|---|
| | Hard Water | Soft Water | Hard Water | Soft Water |
| Polyethenoxy nonyl phenate J | 132 | 105 | 93 | 100 |
| J decolorized with ozone, from table II | 137 | 133 | 140 | 107 |
| J decolorized with hydrogen peroxide and then ozone, from Table III | 135 | 118 | 140 | 106 |

From the foregoing table it is apparent that the detergency is improved by the action of ozone on the original condensate, and on the original condensate which has been decolorized by hydrogen peroxide substantially to the capacity of the latter so to function.

Accordingly, a wide variety of polyethenoxy alkyl phenates is contemplated, varying in the alkyl radical and varying in the content of ethenoxy units, so long as they are water-dispersible.

We claim:

1. The method of treating an aqueous dispersion of a polyethenoxy ether mass of alkyl phenol selected from the group consisting of octyl phenol and nonyl phenol and the bleached product thereof which is the reaction product with aqueous hydrogen peroxide, which unbleached ether mass consists of the reaction products of condensing ethylene oxide with said selected phenol, which comprises increasing the light-transmittancy and detergency thereof by subjecting said aqueous ether dispersion to the action of ozone.

2. The method of treating an aqueous dispersion of a polyethenoxy ether mass of alkyl phenol selected from the group consisting of octyl phenol and nonyl phenol and the bleached product thereof which is the reaction product with aqueous hydrogen peroxide, which unbleached ether mass consists of the reaction products of condensing ethylene oxide with said selected phenol, which comprises subjecting said aqueous dispersion to the action of ozone for a time at least until substantially the maximum light-transmittancy is effected.

3. The method of treating a polyethenoxy ether mass of alkyl phenol selected from the group consisting of octyl phenol and nonyl phenol, which ether mass consists of the reaction products of condensing ethylene oxide with said selected phenol, which comprises increasing the light-transmittancy and detergency thereof by subjecting said ether mass to the action of ozone.

4. The method of treating a polyethenoxy ether mass of alkyl phenol selected from the group consisting of octyl phenol and nonyl phenol, which ether mass consists of the reaction products of condensing ethylene oxide with said selected phenol, which comprises subjecting said ether mass to the action of ozone for a time at least until substantially the maximum light-transmittancy is effected.

5. Non-ionic water-dispersible material consisting essentially of the reaction product of ozone with an ether mass, said mass being selected from the group consisting of (1) the product of condensing ethylene oxide with an alkyl phenol selected from the group consisting of octyl phenol and nonyl phenol, and (2) the product of reacting aqueous hydrogen peroxide with the product of condensing ethylene oxide with said alkyl phenol, said non-ionic material being characterized by increased light-transmittancy and detergency over those characteristics of the ether mass unreacted with ozone.

6. Non-ionic water-dispersible material consisting essentially of the reaction product of ozone with an ether mass, said mass being selected from the group consisting of (1) the product of condensing ethylene oxide with an alkyl phenol selected from the group consisting of octyl phenol and nonyl phenol, (2) the product of reacting aqueous hydrogen peroxide with the product of condensing ethylene oxide with said phenol, the quantity of ozone being at least the amount effective to increase the light-transmittancy to a maximum, said non-ionic material being characterized by increased light-transmittancy and detergency over those characteristics of the ether mass unreacted with ozone.

7. Non-ionic water-dispersible material consisting essentially of the reaction product of ozone with an ether mass, said mass being the product of condensing ethylene oxide with an alkyl phenol selected from the group consisting of octyl phenol and nonyl phenol, said non-ionic material being characterized by increased light-transmittancy and detergency over those characteristics of the ether mass unreacted with ozone.

8. Non-ionic water-dispersible material consisting essentially of the reaction product of ozone with an ether mass, said mass being the product of condensing ethylene oxide with an alkyl phenol selected from the group consisting of octyl phenol and nonyl phenol, the quantity of ozone being at least the amount effective to increase the light-transmittancy to a maximum, said non-ionic material being characterized by increased light-transmittancy and detergency over those characteristics of the ether mass unreacted with ozone.

References Cited in the file of this patent

UNITED STATES PATENTS

| | | |
|---|---|---|
| 1,970,578 | Schoeller et al. | Aug. 21, 1934 |
| 2,075,018 | Bruson et al. | Mar. 30, 1937 |
| 2,496,582 | Enyeart | Feb. 7, 1950 |
| 2,555,285 | Black | May 29, 1951 |
| 2,778,854 | Stoltz | Jan. 22, 1957 |